United States Patent [19]

Stuhr

[11] Patent Number: 5,000,610
[45] Date of Patent: Mar. 19, 1991

[54] STOP PIN APPARATUS

[75] Inventor: Leslie P. Stuhr, Corcoran, Minn.

[73] Assignee: Honeywell Inc., Minneapolis, Minn.

[21] Appl. No.: 447,731

[22] Filed: Dec. 8, 1989

[51] Int. Cl.⁵ ............................................ F16B 13/02
[52] U.S. Cl. .................................. 403/167; 403/388; 403/408.1
[58] Field of Search .................... 403/167, 168, 408.1, 403/388, 405.1, 406.1

[56] References Cited

U.S. PATENT DOCUMENTS

| | | |
|---|---|---|
| 2,152,231 | 3/1939 | Yaneson . |
| 2,402,925 | 6/1946 | Spooner . |
| 2,567,522 | 9/1951 | Moen ............................. 403/168 X |
| 2,898,797 | 8/1959 | Bronstein . |
| 3,068,737 | 12/1962 | Mewse . |
| 3,176,107 | 3/1965 | Temple . |
| 3,203,262 | 8/1965 | Beer . |
| 3,212,350 | 10/1965 | Bradford . |
| 3,411,366 | 11/1968 | Leto . |
| 3,505,884 | 4/1970 | Ford et al. . |
| 4,016,914 | 4/1977 | Zurko . |
| 4,354,298 | 10/1982 | Tanaka et al. ............... 403/408.1 X |
| 4,674,910 | 6/1987 | Hayashi .......................... 403/167 X |
| 4,760,495 | 7/1988 | Till ................................. 403/408.1 X |
| 4,846,615 | 7/1989 | Forsyth ......................... 403/408.1 X |
| 4,896,990 | 1/1990 | Nakamura et al. ........... 403/408.1 X |

*Primary Examiner*—Peter M. Cuomo
*Attorney, Agent, or Firm*—Edward Schwarz

[57] ABSTRACT

A stop pin which has a forward end and a latching end is employed between spaced plates or walls having aligned apertures. The latching end of the stop pin has locking buttons formed on longitudinal faces of the stop pin and a shoulder spaced from the locking buttons by the thickness of the first plate. The forward end of the stop pin is inserted through the first aperture and into the second aperture. Additional axial force on the stop pin forces the lock button through the first aperture by rotating the latching end into relieved portions of the first aperture while the forward end of the stop pin opposes rotation. After the stop buttons pass through the first plate the pin straightens and is latched with the stop button and the shoulder on opposite sides of the first plates.

11 Claims, 2 Drawing Sheets

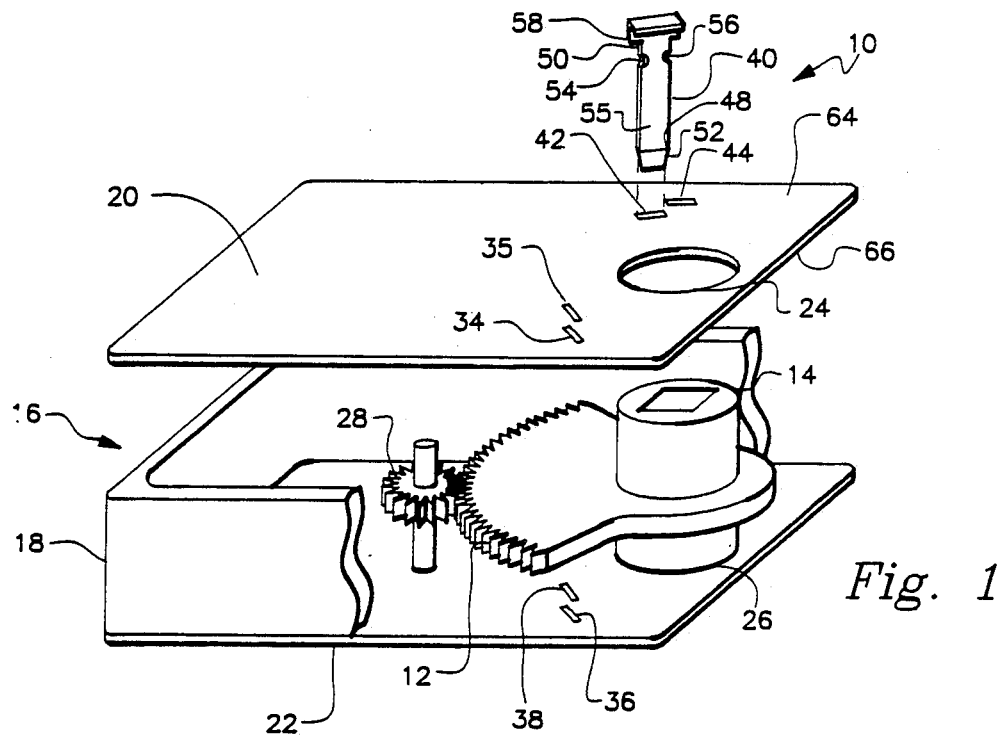
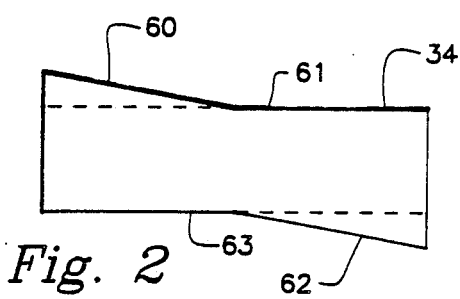
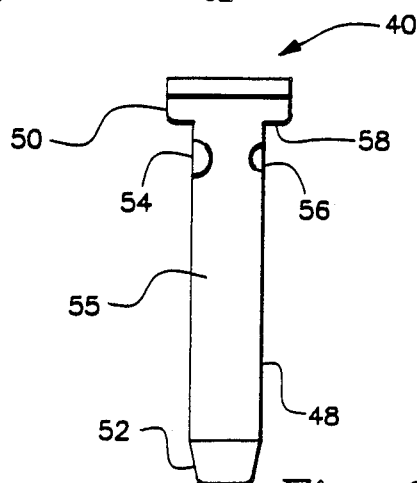
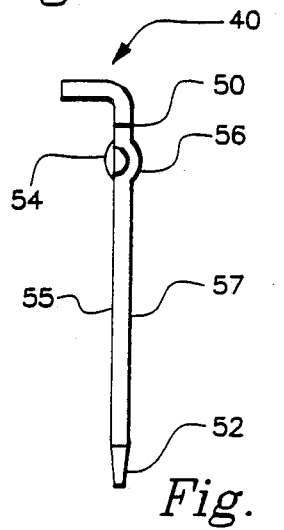

STOP PIN APPARATUS

BACKGROUND

The invention disclosed herein relates generally to stop pin apparatus and particularly to stop pins that are inserted between the walls or plates of a housing to limit the movement of a gear or other member which is located within the housing.

Although the invention will be described in relation to an environment of limiting the rotation of a sector gear of an actuator it will be understood that there is a need for the stop pin apparatus in other environments.

In the past various types of stop pin apparatus have been used including a bolt and nut arrangement. However, changes in the stop pin location require access to both sides of the actuator and removal and reattachment of the nut. For these reasons this is generally not a desirable type of stop pin.

A simple clevis pin has been used. This device includes a shaft having a headed end and a radial bore at the opposite end for receiving a cotter key. This method requires insertion of a cotter key and would require removal and reinsertion of the cotter key if it is necessary to change the location of the stop pin. The manipulation of the cotter key and the need for tools is undesirable in many stop pin applications.

A clevis pin or coupling pin type device that includes a latching means has been used. These devices typically include an axial bore extending substantially through the pin and two opposed radial bores at the insertion end. Two balls are disposed in the radial bores and a shaft having an annular groove is disposed in the axial bore. With the shaft in a first position the balls are received in the annular groove and do not protrude beyond the surface of the pin. This allows the pin to be inserted through a hole in a plate. With the shaft in a second position the balls are forced outwardly and protrude beyond the surface of the pin to engage a surface of the plate. Various means are used to move the shaft between the first position and the second position. While this type of clevis pin can be used for a stop pin application it is a more complex device than is needed.

Thus a need exists for a simple stop pin apparatus that can be easily inserted and removed and does not require the use of tools.

SUMMARY

The present invention solves these and other needs by providing a stop pin apparatus for use in limiting the movement of a gear or other member within a housing which includes a top plate and a bottom plate. Specifically an aperture is formed in the top plate and an aligned aperture is formed in the bottom plate. The apertures have the same general shape except the aperture in the top plate includes diagonally opposite relieved portions. A stop pin having a cross section generally conforming to the shape of the apertures has lock buttons formed on diagonally opposite faces of the stop pin and also has a shoulder spaced from the lock buttons by a distance equal to or slightly greater than the thickness of the top plate. When the forward end of the stop pin is inserted through the top aperture and into the bottom plate aperture the lock buttons will cause slight twisting of the stop pin along its length as the lock buttons pass through the top plate. The forward end will oppose the twisting and after the lock buttons pass through the top plate the latching end will return to the untwisted position with the top plate held between the lock button and the shoulder and with the stop pin removably secured.

DRAWINGS

FIG. 1 shows an exploded perspective view of a stop pin apparatus in accordance with the present invention. A portion of the housing body has been broken away.

FIG. 2 and FIG. 2a show the shape of the aperture in the top plate and the shape of the aperture in the bottom plate respectively.

FIG. 3 and FIG. 3a show a front plan view and a side plan view of the stop pin.

DESCRIPTION

Figure 4:
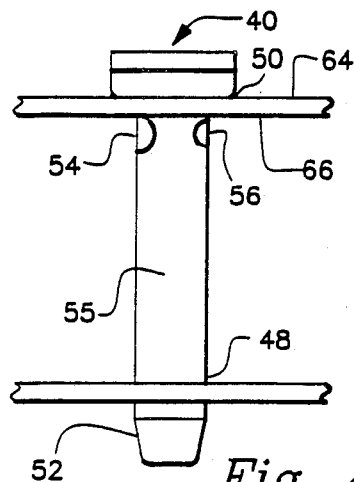
FIG. 4 and FIG. 4a show a front plan view and a side plan view of the stop pin installed in the top and button plates.
Figure 4A:
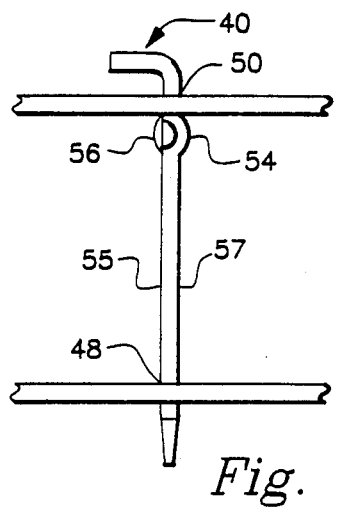

The invention will be described in relation to its use in limiting the rotation of a sector gear mounted on the shaft of an actuator.

Prior to describing the specification of the apparatus of the present invention, the components of the actuator will be described to provide a better understanding of the invention when used in its preferred environment.

In a typical actuator a sector gear 12 as shown in the figures is mounted to shaft 14 and is generally enclosed in a housing 16.

The housing typically includes housing body 18, top plate 20 and bottom plate 22. The top and bottom plates are secured to the housing body 18 by screws or other suitable means.

Bearings are typically used where shaft 14 passes through hole 26 in bottom plate 22 and hole 24 in top plate 20.

A suitable electric motor may be mounted to the housing to provide power to drive gear 28. Drive gear 28 rotates to drive sector gear 12 in a clockwise or a counterclockwise direction.

With no stop pin the clockwise rotation of shaft 14 is limited by a first fixed stop and the counterclockwise rotation of shaft 14 is limited by a second fixed stop. The fixed stops may be part of molded housing body 18. Total rotation between the fixed stops is 90° in the embodiment shown but need not be limited to 90°.

Top plate apertures 34 and 35 are aligned with bottom plate apertures 36 and 38 respectively to allow the use of stop pin 40 to limit clockwise rotation to 45° or 60° accordance with the applicant's invention. It will be understood that different angles or more pin locations could be used.

Similarly top plate apertures 42 and 44 are aligned with bottom plate apertures (not shown) to allow the use of stop pin 40 to limit counter-clockwise rotation to 45° or 60°.

Stop pin 40, top plate aperture 34 and bottom plate aperture 36 will be used as an example to further explain the invention.

Stop pin 40 includes a forward end 48 and a latching end 50. Forward end 48 has a chamfer 52 to provide for easier insertion into the apertures. Lock buttons 54 and 56 are formed on diagonally opposite widths or longitudinal faces 55 and 57 of the latching end of stop pin 40. Lock buttons 54 and 56 are formed at the edge of the longitudinal faces 55 and 57. A shoulder 58 is also formed on latching end 50 with shoulder 58 spaced rearwardly from the lock buttons 54 and 56 by a distance which must be at least equal to the thickness of top plate 20.

Top plate apertures 34, 35, 36 and 38 are in a preferred form generally rectangular and further include relieved portions 60 and 62 and edges 61 and 63.

Bottom plate apertures 36 and 38 are rectangular in shape. It is important that the bottom plate aperture is aligned with its respective top plate aperture. Excessive errors in alignment make it difficult to insert stop pin 40.

Pin 40 may be constructed of mild steel so long as the twisting of the latching end of the pin does not exceed the yield point of the pin material used. The pin could also be constructed of spring steel. Satisfactory results have been achieved using mild steel.

In operation, the forward end 48 of stop pin 40 is first inserted through aperture 34 and into aperture 36 until lock buttons 54 and 56 are at top surface 64.

The function of aperture 36 in bottom plate 22 is to hold forward end 48 and to oppose axial rotation of the forward end.

In order to fully insert and latch the stop pin additional axial force is applied to latching end 50 in the direction of top plate 20.

The additional axial force will force lock buttons 54 and 56 into aperture 34 and will create a twisting force on latching end 50. Relieved portions 60 and 62 of aperture 34 will allow the latching end 50 of pin 40 to rotate sufficiently to allow lock buttons 54 and 56 to pass through aperture 34 by a camming action against edges 61 and 63. During the preceding action, forward end 48 in aperture 36 has been prevented from rotating.

Once lock buttons 54 and 56 have passed bottom surface 66 of the top plate 20, the stored energy in stop pin 40 will return it to a straightened or untwisted position. When latching end 50 straightens, top plate 20 will be captured between lock buttons 54 and 56 and shoulder 58. Stop pin 40 will then be held sufficiently secure to perform the stop pin function. However when necessary stop pin 40 may be removed by pulling latching end 50 away from top plate 20. The stop pin may then be reinserted at a new location.

Figure 5:
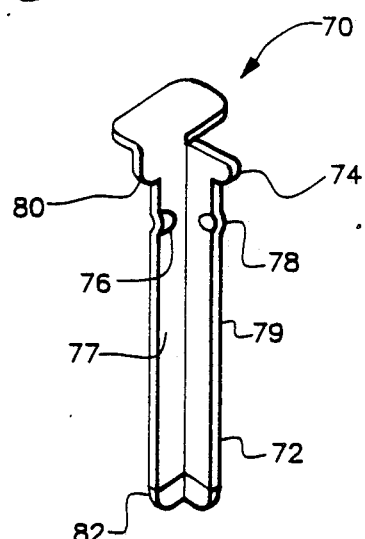
FIG. 5 shows an alternate embodiment of the present invention.
Figure 6:
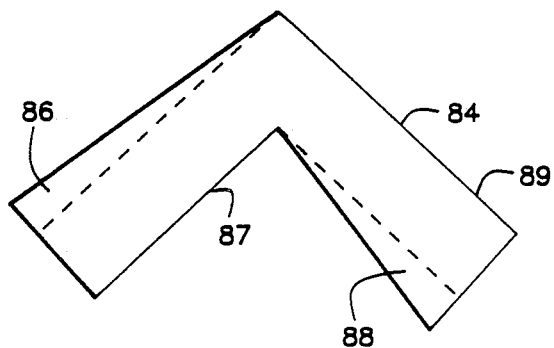
FIG. 6 and FIG. 6a show the shape of the aperture in the top plate and the shape of the aperture in the bottom plate respectively for the alternate embodiment.
Figure 6A:
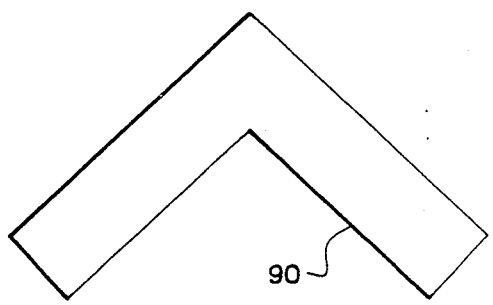

An alternate embodiment of device 10 according to the teachings of the present invention is shown in FIG. 5, 6, and 6A. This configuration may be desirable when higher gear torques are encountered. This configuration provides greater rigidity while retaining the ability to be inserted by hand. The alternate embodiment is also formed of readily available and inexpensive materials.

Stop pin 70 is constructed from material having a right angle cross-section. Stop pin 70 has a forward end 72 and a latching end 74. Lock buttons 76 and 78 are formed on longitudinal faces 77 and 79 of stop pin 70 at latching end 74. A stepped portion or shoulder 80 is also formed on latching end 74. Shoulder 80 is spaced from lock buttons 76 and 78 by a distance equal to or slightly greater than the thickness of the top plate. A chamfer 82 is formed on forward end 72 to facilitate insertion.

The configuration for top plate aperture 84 is shown in FIG. 9. Aperture 84 requires relieved portions 86 and 88 to allow slight rotation of latching end 74 when stop pin 70 is inserted.

The configuration for bottom plate aperture 90 is shown in FIG. 6A. The shape of aperture 90 conforms generally to a cross section of pin 70 taken between the longitudinal location of lock buttons 76 and 78 and chamfer 82.

In operation, forward end 72 of stop pin 70 is first inserted through top plate aperture 84 and into bottom plate aperture 90. The function of bottom plate aperture 90 is to hold forward end 72 and to oppose axial rotation of the forward end.

In order to fully insert and latch stop pin 70 an additional force is applied to forward end 74 in the direction of the top plate.

The additional axial force will force lock buttons 76 and 78 into aperture 84 and will create a twisting force on latching end 74. Relieved portions 86 and 88 will allow the latching end of pin 70 to rotate sufficiently to allow lock buttons 76 and 78 to pass through aperture 84 by a camming action against edges 87 and 89.

Once lock buttons 76 and 78 have passed through aperture 84 the stored energy in stop pin 70 will return it to an untwisted portion. The top plate will then be captured between lock buttons 76 and 78 and stepped portions or shoulder 80.

When necessary stop pin 70 may be easily removed and inserted at a new location.

In accordance with the foregoing description applicant has developed a simple stop pin apparatus that is easily incorporated into the design of conventional actuators.

The present invention may be manufactured from simple, readily available and low cost components. Further apparatus 10 may be manufactured using ordinary metal working machinery as is employed by machine shops.

The embodiments of an invention in which an exclusive property or right is claimed are defined as follows:

1. A stop pin apparatus comprising:
   a first plate having a first side, a second side and a thickness, the first plate further having a first aperture, the first aperture having a predetermined shape and an aperture edge;
   a second plate spaced from said first plate by a predetermined distance, the second plate having a second aperture, the second aperture having a shape approximately conforming to the shape of the first aperture and being aligned with the first aperture;
   a stop pin having a forward end, a latching end, a first longitudinal face having an edge, a length, and a cross section with the length being greater than the predetermined distance and the cross section for complimentary sliding receipt in the apertures;
   a first projection formed at the edge on the first longitudinal face of the stop pin at the latching end;
   a shoulder located at the latching end, the shoulder spaced rearwardly from the projection by a distance substantially equal to the thickness of the first plate;
   the first aperture further having relieved portions; and
   the forward end, inserted through the first aperture and into the second aperture with axial force, to the latching end causing rotation of the latching end into the relieved portions as the first projection cams across the first aperture edge, with the second aperture opposing rotation of the forward end, and with the stop pin coming to rest in a latched position with the shoulder abutting the first side of the first plate, and the first projection abutting the second side of the first plate.

2. The stop pin assembly of claim 1 wherein the cross section of the stop pin is rectangular.

3. The stop pin assembly of claim 2 wherein the stop pin has a second longitudinal face and a second projection is formed on the second longitudinal face with the second projection being diagonally opposite the first projection.

4. The stop pin assembly of claim 3 wherein the forward end of the stop pin has a chamfer to facilitate insertion.

5. The stop pin assembly of claim 4 wherein the latching end has a shape that can be grasped by a user for ease of insertion and removal.

6. The stop pin assembly of claim 1 wherein the latching end has a shape that can be grasped by a user for ease of insertion and removal.

7. A stop pin apparatus comprising:
a first plate having a first side, a second side and a thickness, the first plate further having a first aperture, the first aperture having a generally rectangular cross section,
a second plate spaced from said first plate by a predetermined distance, the second plate having a second aperture, the second aperture having a shape generally conforming to the first aperture and being substantially aligned with the first aperture;
a stop pin having a forward end, a latching end, a width and a length with the length being greater than the predetermined distance;
a first projection formed on the width of the stop pin at the latching end;
a shoulder at the latching end, the shoulder spaced rearwardly from the projection by a distance substantially equal to the thickness of the first plate; and
the first aperture further having two diagonally opposite relieved portions with the forward end being inserted through the first aperture and into the second aperture with the projection causing axial rotation of the latching end into the relieved portions as the projection passes through the first aperture with the second aperture opposing the rotation of the forward end, with the stop pin coming to rest in a latched position with the shoulder abutting a first side of the first plate and the projection abutting the second side or the first plate.

8. The stop pin apparatus or claim 7 wherein the forward end has a chamfer to facilitate insertion.

9. The stop pin apparatus or claim 8 wherein the latching end has a shape which can be grasped by a user for ease of insertion and removal of the stop pin.

10. The stop pin apparatus of claim 9 further comprising a second projection formed on the width, with the second projection being diagonally opposite the first projection.

11. The stop pin apparatus of claim 7 further comprising a second projection formed on the width, with the second projection being diagonally opposite the first projection.

* * * * *

UNITED STATES PATENT AND TRADEMARK OFFICE
CERTIFICATE OF CORRECTION

PATENT NO. : 5,000,610
DATED      : March 19, 1991
INVENTOR(S): LESLIE P. STUHR

It is certified that error appears in the above-identified patent and that said Letters Patent is hereby corrected as shown below:

Column 6, line 17, cancel "or" and substitute --of--;

Signed and Sealed this

Twenty-fifth Day of August, 1992

*Attest:*

DOUGLAS B. COMER

*Attesting Officer* — *Acting Commissioner of Patents and Trademarks*